Patented May 24, 1949

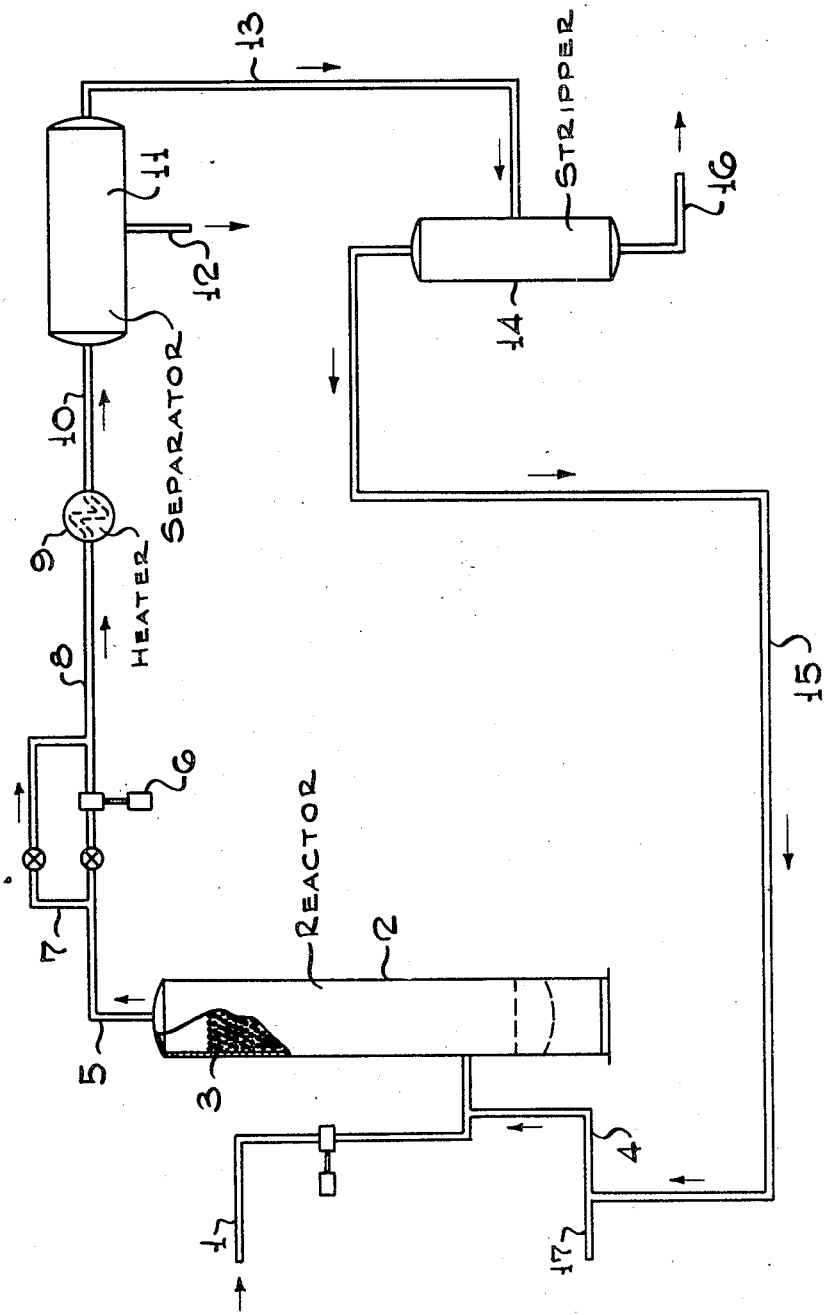

2,471,054

UNITED STATES PATENT OFFICE 2,471,054

REMOVAL OF SOLUBLE CATALYSTS FROM PRODUCT STREAMS

Erwin H. Amick, Jr., Linden, N. J., assignor to Standard Oil Development Company, a corporation of Delaware Application December 26, 1946, Serial No. 718,302

4 Claims. (Cl. 260—683.5)

This invention relates to the treatment or conversion of hydrocarbons with the aid of catalysts or contact materials comprising metal halides and relates more particularly to catalytic hydrocarbon conversions executed in the presence of metal halides of the Friedel-Crafts type. A particular aspect of the invention relates to the production of branched chain saturated hydrocarbons from hydrocarbons comprising saturated hydrocarbons of straight chain or less branched chain structure.

Metal halides find application as catalysts or contact materials in many processes comprising those directed to the conversion or treatment of hydrocarbons. The manner in which these metal halides are employed varies in accordance with the particular process in which they are used. They may be used in solid form in which the size of the individual pieces may range from relatively large chunks to finely divided form. When used in the latter form they may be employed in combination with any of the many available carrier materials or as a suspension in liquid or gaseous media or as a solution in liquid. In other processes they are used in the molten state functioning as catalysts, as diluents, as carrying media for reactants or other catalytic materials, or merely as means for imparting heat to, or withdrawing heat from, reactants or catalysts by direct contact therewith. In still other processes they may be utilized in the vapor state. Of the metal halides used those of the Friedel-Crafts type are particularly favored because of their ability to function as catalysts for a great number of differing catalytic reactions wherein their degree of activity can be modified to attain particular results under specific operating conditions. These processes may employ a single metal halide or a mixture of two or more metal halides. Certain processes use the metal halide in a modified form, obtained, for example, as a reaction product resulting from the interaction of the metal halide with a suitable organic compound comprising, for example, a suitable olefinic, aromatic, naphthenic or even paraffinic hydrocarbon.

The degree to which the metal halides dissolve in hydrocarbons with which they are brought into contact during the process, as well as the ease with which they volatilize or sublime, will vary considerably depending upon the particular metal halide or mixture of halides, the nature and composition of the reactants and the operating conditions employed. The greater part of these compounds, particularly those of the Friedel-Crafts type, possess one or several of these characteristics to a sufficient degree to render difficult, if not impossible, the complete avoidance of entrainment of small amounts thereof from the reaction zone together with the product stream. By the term "entrainment" as used throughout this specification and claims is meant any removal of metal halide from the reaction zone (and/or, in the case of liquid phase operation, from a catalyst separator comprising the type wherein catalyst is separated from reactants by stratification) together with the reactants regardless of whether such removal be caused by physical entrainment, solution, volatilization, sublimation or any other method by which migration from the greater catalytic mass may be effected. Use of the catalyst in a finely divided state, the admixture of gaseous materials to the reactants and certain operating conditions, such as elevated temperatures and rapid throughput rates, variations in pressures, etc., contribute considerably to increasing the normal rate of entrainment generally encountered in the greater number of processes utilizing the metal halides as contact or catalytic materials.

Though the amount of metal halide so entrained from the reaction zone may appear from casual observation to be a relatively small and therefore an unimportant factor, it nevertheless is a major problem in processes utilizing these materials in the reaction zone and often results in difficulties deterring practical operation of a process. Thus, in processes utilizing a metal halide of the Friedel-Crafts type, such as, for example, aluminum chloride, the presence of the metal halide in the reactor effluent in such relatively small amounts as, for example, about 0.01%, seriously impairs efficient large scale operation of the process in the absence of means for the substantially complete removal of the entrained compound from the product stream prior to its passage into a subsequent product separating zone comprising fractionating systems. Such small amounts of entrained metal halide, even though in the presence of a sufficient amount of hydrocarbon to effect their solution under normal conditions, still result in serious fouling of heat exchangers, condensers, reboilers and other parts of the equipment. They seriously interfere with normal operation of pumps, valves, control mechanisms, etc., and materially increase corrosion.

Means resorted to heretofore to effect the separation of these traces of entrained metal halides from the product stream have often been cumbersome and costly. Though certain methods enable substantial removal of the entrained material from the product stream, they are nevertheless generally handicapped by disadvantages which often offset to a substantial degree the benefits thereby obtained. The utilization of adsorptive support materals for the catalyst in the reaction zone, though reducing the degree of entrainment, in no wise eliminates it to any sufficient extent. Separation of entrained metal halide can be achieved to a substantial degree by the passage of the reactor effluence through beds of porous, and preferably highly adsorptive, materials. Such methods, though enabling substantial removal of entrained metal halide from the product stream possess distinct disadvantages. Complete removal of the entrained material requires the use of large masses of the porous material and consequently cumbersome and costly apparatus. The method can, furthermore, not be operated continuously and requires periodic replacement of the porous mass. Recovery of the separated catalyst from the porous material is difficult and generally highly impractical. A more serious disadvantage of such methods resides in the fact that, notwithstanding intensive dehydration of the adsorptive material, its use in plant scale operation is, nevertheless, generally accompanied by a release of a still sufficient amount of water from the adsorbent during the course of operation to result not only in serious corrosion in subsequent pieces of apparatus, particularly when hydrogen halides are present, but in making necessary such steps as the drying of recycle streams prior to their return to the reaction zone. When hydrogen halide is one of the products to be recycled, and must be introduced into the reaction zone in the anhydrous state, the removal of traces of water therefrom is not only difficult but exceedingly costly. Introduction of additional liquid hydrocarbons into the reactor effluence for the purpose of dissolving the entrained metal halide, such as, for example, an aluminum halide, during its passage through the remainder of the system, does not of itself avoid such difficulties as the fouling of heat exchangers, condensers and reboilers, etc. Attempts to concentrate the entrained metal halide in one of the fractions separated during the course of a fractionation directed to the separation of the product stream into ultimately desired fractions, are, of course, distinctly undesirable not only in that they render difficult efficient operation of such fractionating system but entail the operating and corrosion difficulties above-referred to in relatively costly and extensive portions of the apparatus.

It is an object of the invention to provide an improved process for the treatment or conversion of hydrocarbons with catalysts or contact materials comprising metal halides wherein the above difficulties are obviated and complete removal of any substantial traces of entrained metal halide from the reactor effluence is effected efficiently in a simple continuous and uninterrupted step within the process prior to subjection of said reactor effluence to any substantial degree of fractionation.

Another object of the invention is to provide a process for the more efficient treatment or conversion of hydrocarbons with the aid of metal halide catalyst of the Friedel-Crafts type, enabling the substantially complete separation of entrained metal halide from the reactor effluence prior to introduction of said reactor effluence into a product separating zone.

Still another object of the invention is the provision of an improved process for the more efficient production of branched chain saturated hydrocarbons from hydrocarbons comprising straight and/or less branched chain saturated hydrocarbons with aid of metal halide catalysts of the Friedel-Crafts type, enabling the more efficient separation of substantially all traces of entrained metal halide from the reactor effluence prior to its introduction into a produce separating zone.

Another object of the invention is to provide an improved process for enabling the more efficient isomerization of paraffinic hydrocarbons with the aid of catalysts comprising aluminum halide in the presence of a hydrogen halide promoter. Other objects and advantages of the invention will become apparent from the following detailed description thereof.

In accordance with the invention hydrocarbons comprising a hydrocarbon, or mixture of hydrocarbons, to be converted or treated are contacted with a catalyst or contact material comprising a metal halide of the Friedel-Crafts type, such as aluminum chloride, in a suitable reaction zone under conversion or treating conditions. Effluence from the reaction zone, comprising hydrocarbons and entrained metal halide, is treated so as to bring it into or close to its critical region so that two phases are formed, one which is rich in aluminum chloride and the other which is essentially free of aluminum chloride. The phases are then separated in a settling drum, centrifugal or other known separation means so as to recover a substantially aluminum chloride-free hydrocarbon stream suitable for the customary processing steps. The actual temperature and pressure of operation of the separation step depends on the composition of the hydrocarbon portion of the aluminum-chloride containing stream. In the isomerization of butane, the product stream is heated to 270°–320° F. and the pressure is maintained at 500–600 lbs. per sq. in. absolute. In ordinary practice, if sufficient pressure is maintained in the reactors, it is simply necessary to raise the temperature to the critical region. The aluminum chloride-rich phase immediately separates and is removed.

The process of the invention is applicable to the execution of a wide variety of catalytic hydrocarbon conversions and treatment effected with the aid of catalysts or contact agents comprising metal halides, such as isomerization, alkylation, etc. However, in order to set forth more fully the nature of the invention, it will be described in detail herein in its application to the production of branched chain hydrocarbons from hydrocarbons comprising straight chain or less branched chain hydrocarbons, with reference to the attached drawing.

Referring now to the drawing, numeral 1 designates a feed line which, for purposes of illustration, carries normal butane which is to be isomerized. This material is introduced into reactor 2 which contains a bed 3 of adsorbent catalyst support such as bauxite impregnated with aluminum chloride. A promoter is introduced into feed line 1 by branch line 4. This promoter may be fresh promoter carried through line 17 and recycle promoter from line 15. The reaction zone is maintained at a temperature of 150° to 220° F. and a pressure of from 100 to 600 lbs./sq. in., preferably between 500 and 600 lbs./sq. in. The reaction product is passed by line 5 to booster pump 6 where the pressure is raised to 500–600 lbs./sq. in. absolute if necessary. If the pressure in reactor 2 is already within this range the product can be sent through line 7 and by pass pump 6. The product is then passed by line 8 to heater 9 where the temperature is raised to 270°-320° F. This temperature and pressure is close to or within the critical region and as a result an aluminum chloride-rich phase will be formed. The heated product is passed through line 10 into separator 11 where the aluminum chloride-rich phase is removed through line 12. The substantially aluminum chloride-free product is then removed from separator 11 through line 13 and passed to hydrogen chloride stripper 14 where hydrogen chloride is removed overhead and recycled by line 15 to line 4 and isomerized product is removed through line 16 to additional fractionation equipment (not shown).

It is thus seen that the process of the invention by enabling the removal of substantially all traces of entrained aluminum chloride from the reactor effluence eliminates completely the difficulties due to catalyst entrainment by a relatively simple method exceeding by far in practicality the methods utilized heretofore.

Although the detailed description of the invention has been directed to the isomerization of a straight chain paraffin, it is to be understood that the invention is in no wise limited in its application to the isomerization of any particular hydrocarbon and may be applied broadly not only to the isomerization of any isomerizable hydrocarbon with the aid of metal halide catalysts but to any type of hydrocarbon conversion operation wherein use is made of catalysts or contact materials comprising a metal halide. Such conversion operations comprise not only isomerization but alkylation, cracking, polymerization, desulfurization, reforming, etc., of hydrocarbons or hydrocarbon-containing materials.

The nature and objects of the present invention having been thus described and illustrated, what is claimed as new and useful and is desired to be secured by Letters Patent is:

1. Improved process for the conversion of saturated hydrocarbons into branched chain hydrocarbons which comprises contacting a feed stream comprising saturated hydrocarbons in an isomerization zone with a catalyst comprising an aluminum halide, maintaining temperature and pressure conditions in said isomerization zone adapted to secure the desired conversion, removing a product stream from said isomerization zone, further heating said product stream in a heating zone to a temperature near but not above its critical temperature, maintaining a sufficient pressure on said product stream to maintain the same in the liquid phase, passing said product stream at said elevated temperature and pressure to a separation zone, whereby a phase relatively rich with said aluminum halide catalyst separates from a liquid product phase substantially free of said aluminum halide catalyst, separating said phase relatively rich in aluminum halide catalyst, passing the product phase substantially completely free of aluminum halide catalyst to a fractionating zone and separating a gaseous stream from said product stream in said fractionating zone.

2. Process as defined by claim 1 wherein said feed stream comprising hydrocarbons containing at least 4 carbon atoms in the molecule, wherein the temperature maintained in said isomerization zone is in the range from about 150-220° F., wherein the temperature maintained in said heating zone and in said separation zone is in the range from about 270-320° F. and wherein said pressure is in the range from about 500-600 lbs. per square inch.

3. Process as defined by claim 1 wherein said catalyst comprises a hydrogen halide and wherein said hydrogen halide is removed with said gaseous stream from said fractionating zone.

4. In a catalytic butane isomerization process wherein butane is converted to isobutane by contact in admixture with a hydrogen halide at isomerizing conditions with a catalyst comprising an aluminum halide in a reaction zone, reactor effluence comprising isobutane, normal butane, hydrogen halide and entrained aluminum halide is passed to a fractionating zone and a gaseous fraction comprising hydrogen halide is separated from a liquid fraction comprising butane in said fractionating zone, the steps which comprise heating said effluence after it has been removed from said reactor in a heating zone to a temperature near but not above the critical temperature of the hydrocarbons present in the said effluence in the range from about 270-320° F. under pressure in the range from about 500-600 lbs. per square inch, whereby an aluminum halide-rich and an aluminum halide-free liquid phase are formed, separating the aluminum halide-rich liquid phase and fractionating the aluminum halide-free liquid phase.

ERWIN H. AMICK, JR.

REFERENCES CITED

The following references are of record in the file of this patent:

UNITED STATES PATENTS

| Number | Name | Date |
| --- | --- | --- |
| 2,378,782 | Mason | June 19, 1945 |
| 2,394,810 | Ross | Feb. 12, 1946 |
| 2,395,022 | Sutton et al. | Feb. 19, 1946 |
| 2,395,680 | Nysewander et al. | Feb. 26, 1946 |